United States Patent
Tadiello et al.

(10) Patent No.: US 11,673,804 B2
(45) Date of Patent: Jun. 13, 2023

(54) PROCESS AND PLANT FOR PRODUCTION OF PURE CARBON MONOXIDE AND HYDROGEN

(71) Applicant: L'Air Liquide, Société Anonyme pour l'Etude et l'Exploitation des Procédés Georges Claude, Paris (FR)

(72) Inventors: Jean-Philippe Tadiello, Frankfurt am Main (DE); Yue Chen, Shanghai (CN)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 148 days.

(21) Appl. No.: 17/212,864

(22) Filed: Mar. 25, 2021

(65) Prior Publication Data
US 2021/0300757 A1    Sep. 30, 2021

(30) Foreign Application Priority Data

Mar. 26, 2020 (EP) .................................. 20020136

(51) Int. Cl.
*C01B 3/38* (2006.01)
*B01D 53/047* (2006.01)

(52) U.S. Cl.
CPC ............ *C01B 3/382* (2013.01); *B01D 53/047* (2013.01); *C01B 2203/0233* (2013.01);
(Continued)

(58) Field of Classification Search
CPC ............ C01B 3/382; C01B 2203/0233; C01B 2203/0425; C01B 2203/0475; C01B 2203/0495; C01B 2203/0415; C01B 2203/043; C01B 2203/0811; C01B 3/384; C01B 2203/0827; C01B 32/40; C01B 3/506; C01B 2203/046; C01B 2203/1235; C01B 2203/1241; C01B 2203/1247;
(Continued)

(56) References Cited

U.S. PATENT DOCUMENTS

| 6,232,352 | B1 | 5/2001 | Vidalin |
| 8,888,873 | B2 * | 11/2014 | Haik-Beraud ......... C01B 3/382 |
| | | | 423/220 |
| 9,512,004 | B2 | 12/2016 | Lang et al. |

FOREIGN PATENT DOCUMENTS

DE    10 2007 059543    6/2009

OTHER PUBLICATIONS

European Search Report for corresponding EP 20020136.6, dated Sep. 2, 2020.
(Continued)

*Primary Examiner* — Steven J Bos
*Assistant Examiner* — Syed T Iqbal
(74) *Attorney, Agent, or Firm* — Elwood L. Haynes

(57) ABSTRACT

Proposed is a process and a plant for production of pure carbon monoxide and hydrogen by steam reforming of hydrocarbons, preferably methane or naphtha, to afford a raw synthesis gas and subsequent, multistage workup, purification and fractionation of the raw synthesis gas to afford the target products, wherein the material streams obtained as by-products of the process chain are also to be advantageously utilized. This is achieved according to the invention by providing the recirculating compressor provided for recycling of the by-product material streams with a plurality of parallel, independently operable compressor stages.

2 Claims, 2 Drawing Sheets

(52) U.S. Cl.
CPC .......... *C01B 2203/0425* (2013.01); *C01B 2203/0475* (2013.01); *C01B 2203/0495* (2013.01)

(58) Field of Classification Search
CPC ....... C01B 2203/148; C01B 3/56; C01B 3/38; C01B 3/52; C01B 3/34; C01B 32/50; B01D 53/047; F25J 2245/02; F25J 3/0252; F25J 3/0261; F25J 3/0223; F25J 3/0233; F25J 2205/30; F25J 2205/50; F25J 2205/64; F25J 2205/66; F25J 2210/04; F25J 2220/02; F25J 2230/32; F25J 2260/60; Y02C 20/40; F04B 41/06
See application file for complete search history.

(56) References Cited

OTHER PUBLICATIONS

Ullmann's Encyclopedia of Industrial Chemistry, B. Elvers, S. Hawkins, M. Ravenscroft, J.F. Rounsaville, G. Schulz, eds., $5^{th}$ (1996) and $6^{th}$ (2000) editions, 1-2, 77-82, 161-162, 270-271, 399-407.
Gasification, C. Higman and M. van der Burgt, eds., Ch. 8.2.3, Adsorption systems, Gulf Professional Publishing, Burlington, MA (2003), 340-343.
Industrial Gases Processing, Ch. 5.2.3.6, Cryogenic separation processes, H.W. Haring, ed., Wiley-VCH, Weinheim, 2008, 153-156.

\* cited by examiner

PROCESS AND PLANT FOR PRODUCTION OF PURE CARBON MONOXIDE AND HYDROGEN

CROSS REFERENCE TO RELATED APPLICATIONS

This application claims the benefit of priority under 35 USC 119 (a) and (b) to EP 20020136.6, filed Mar. 26, 2020, the entire contents of which are incorporated herein by reference.

BACKGROUND

Field of the Invention

The invention relates to a process and a plant for production of pure carbon monoxide and hydrogen by steam reforming of hydrocarbons, preferably methane or naphtha, to afford a raw synthesis gas and subsequent, multistage workup, purification and fractionation of the raw synthesis gas to afford the target products, wherein the material streams obtained as by-products of the process chain are also to be advantageously utilized.

Prior Art

Hydrocarbons may be catalytically reacted with steam to afford synthesis gas, i.e. mixtures of hydrogen ($H_2$) and carbon monoxide (CO). So-called steam reforming is the most commonly employed method of producing synthesis gas which may then be converted into further important commodity chemicals such as methanol or ammonia. While different hydrocarbons, such as for example naphtha, liquid gas or refinery gases may be converted, it is steam reforming of methane-containing natural gas that dominates. Further important processes for synthesis gas production are for example autothermal reforming (ATR) and partial, noncatalytic (POX) or catalytic oxidation of hydrocarbons.

After pre-heating by heat exchangers or fired heaters to a temperature above about 500° C., for example up to 650° C., the hydrocarbon-steam mixture enters the reformer tubes of the steam reformer after end-heating to about 800° C. to 950° C. and is therein converted into carbon monoxide and hydrogen over the reforming catalyst. Nickel-based reforming catalysts are widespread. While higher hydrocarbons are fully converted into carbon monoxide and hydrogen, in the case of methane partial conversion is typical. The composition of the product gas is determined by the reaction equilibrium; the product gas thus comprises not only carbon monoxide and hydrogen but also carbon dioxide, unconverted methane and water vapour. For energy optimization or for input materials comprising higher hydrocarbons a so-called pre-reformer for pre-cracking the input material may be employed downstream of the pre-heater. The pre-cracked input material is then heated to the desired reformer tube entry temperature in a further heater.

The hot synthesis gas product gas is partially cooled in indirect heat exchange against process media to be heated in one or more heat exchangers after leaving the reformer furnace. The partially cooled synthesis gas product gas then passes through further conditioning steps dependent on the type of the desired product or of the downstream process.

The further workup of the produced, partially cooled raw synthesis gas often also comprises a process for removing further unwanted concomitants, for example by physical or chemical absorption or gas scrubbing. Thus such processes may be used to safely remove down to the trace range unwanted, acidic constituents of raw synthesis gases produced by gasification or reforming of carbon-containing inputs, for example carbon dioxide ($CO_2$) and hydrogen sulfide ($H_2S$), but also further constituents such as carbonyl sulfide (COS), hydrogen cyanide (HCN) or mercaptans (RSH), from the wanted synthesis gas constituents hydrogen and carbon monoxide. A known and often employed process is the Rectisol process which comprises a scrubbing of the raw synthesis gas with cryogenic methanol as the absorbent and is likewise described in principle in the abovementioned document. Other scrubbing processes employ other scrubbing or absorption media, for example N-methylpyrrolidone (NMP), secondary amines, for example diethanolamine, tertiary amines, for example methyldiethanolamine (MDEA), polyethylene glycol dialkyl ethers, for example polyethylene glycol dimethyl ether. The thus-removed carbon dioxide may be entirely or partially recycled to the synthesis gas production, for example the steam reforming, for material utilization and to reduce the $H_2$/CO molar ratio. This is desirable especially when carbon monoxide is one of the target products of the process. Apparatuses operated by such a process are hereinbelow generally referred to as a carbon dioxide removal unit. The specific process conditions to be employed here, whose selection is familiar to those skilled in the art, are hereinbelow referred to as carbon dioxide removal conditions.

Removal of methane and traces of higher hydrocarbons and separation of carbon monoxide and hydrogen may be achieved using a multistage cryogenic gas fractionation which on account of common arrangement of the individual separation stages in a housing thermally insulated from the environment is also referred to as a coldbox. This employs mainly liquid methane or liquid nitrogen to absorb higher boiling gases such as carbon monoxide. Depending on the composition of the synthesis gas two different processes are used industrially to separate the raw synthesis gas into the components $H_2$ and CO, namely the condensation process or methane scrubbing.

In the condensation process the dried raw synthesis gas is cooled using heat exchangers to such an extent that the gas phase, the crude hydrogen, may be removed from the CO/methane-rich liquid phase using a separator. The "refrigeration" required for cooling is provided by the crude hydrogen to be heated and the evaporating CO. The hydrogen still dissolved in the liquid phase is removed in the downstream hydrogen stripping column. The CO/methane mixture thus freed of $H_2$ is in a second column resolved by low-temperature distillation to obtain pure CO as the tops product and methane as the bottoms product. Generated as a mixture of the tops product from the hydrogen stripping column and the bottoms product from the CO/methane distillation column is a low pressure offgas which is suitable as a fuel gas. The crude hydrogen may be further purified in a PSA plant. The condensation process is preferably used for resolution of CO-rich high-pressure synthesis gases having a low methane content as obtained for example from the partial oxidation of hydrocarbons.

Apparatuses operated by a process of cryogenic gas fractionation are hereinbelow generally referred to as a low-temperature fractionation unit. The specific process conditions to be employed here, whose selection is familiar to those skilled in the art, are hereinbelow referred to as low-temperature fractionation conditions.

For raw synthesis gas from steam reformers having a higher $H_2$/CO ratio and a higher residual methane content methane scrubbing is better suited than the condensation process for obtaining pure CO and crude hydrogen. In a first column, the so-called scrubbing column, the majority of the hydrogen is removed from the cooled raw synthesis gas by scrubbing-out of the other components. The solvent used is supercooled, high-purity liquid methane which is cooled with evaporating CO to remove the heat of solution. In the downstream hydrogen stripping column the bottoms product from the scrubbing column is freed from the still-dissolved hydrogen. The CO/methane bottoms product from the hydrogen stripping column is resolved in the downstream CO/methane distillation column to obtain pure CO as the tops product and methane as the bottoms product. The CO purity at the top of this column is adjusted via the reflux ratio of supercooled pure CO. Excess methane is liberated at low pressure together with the tops product from the hydrogen stripping column and used as a fuel gas for example.

In order to avoid blockage of the process stages contained in the coldbox by ice formation said coldbox typically has arranged upstream of it a dryer and/or adsorber filled with a suitable adsorbent, based on molecular sieves for example, by means of which proportions of water and further undesired trace impurities may be removed.

The carbon monoxide discharged from the coldbox may be supplied to consumers as a pure product.

To produce pure hydrogen this is typically followed by a final step of treatment of the crude hydrogen stream in a plant for pressure swing adsorption (PSA. The pressure swing adsorption uses molecular sieves as adsorbents in a series of containers operated in a staggered cyclic mode which switches between an adsorption phase and different phases of regeneration. It is possible to achieve a very high purity with about 50 ppm of argon and less than 10 ppm of other impurities.

US patent specification U.S. Pat. No. 8,888,873 B2 discloses by way of example such a synthesis gas production and synthesis gas workup comprising the process stages synthesis gas production—acid gas ($CO_2$) removal—drying and adsorption of disruptive components—low-temperature fractionation of the synthesis gas in a coldbox. Reference is especially made to FIG. 1 therein and to the accompanying figure description.

This discloses that a $CO_2$-rich stream from the $CO_2$ removal stage and/or gas streams from the low-temperature fractionation which contain hydrogen, carbon monoxide and/or methane are recycled to the synthesis gas production stage using one or more compressors, thus allowing better material utilization thereof.

US patent specification U.S. Pat. No. 9,512,004 B2 likewise discloses a process chain of the recited type. This document teaches the use of a recirculating compressor to realize the following different operating modes:

(a) in a first operating mode carbon dioxide removed from the synthesis gas is at least partially admixed with the hydrocarbon-rich input (b), (b) in a second operating mode the residual gas removed in the pressure swing adsorption plant is at least partially admixed with the hydrogen-rich fraction upstream of the pressure swing adsorption plant using the recirculating compressor.

The disadvantage here is that the recirculating compressor can in each case be employed for only one of the described operating modes.

In order to allow coverage of further capacity ranges of the synthesis gas production plant the recirculating compressor is often implemented in multistage form, wherein a plurality of partial-capacity compressor stages are arranged in parallel. Accordingly a configuration of the recirculating compressor having for example three parallel compressor stages each having 50% of the nominal capacity allows a capacity range between 50% and 150% and thus very flexible operation of the synthesis gas production plant. However, one disadvantage is that with the exception of operation at 150% of nominal capacity one or even two of the parallel compressor stages remain unused and thus form dead capital.

There therefore remains a need for processes for production of pure carbon monoxide and pure hydrogen which cover a wide range of different production capacities and simultaneously achieve optimal material utilization of the components present in the by-product streams.

SUMMARY

The present invention thus has for its object to specify a process and a plant for production of pure carbon monoxide and of hydrogen which do not exhibit the recited disadvantages of the prior art.

This object is solved in a first aspect by a process having the features of Claim 1 and with a plant having the features of Claim 10. Further embodiments of the invention are apparent from the subsidiary claims of the respective category.

Steam reforming conditions are known to those skilled in the art from the prior art, for example the documents discussed at the outset. These are the physicochemical conditions under which a measurable, preferably industrially relevant, conversion of hydrocarbons to synthesis gas products is achieved. Necessary adjustments of these conditions to the respective operational requirements will be made on the basis of routine experiments. Any specific reaction conditions disclosed may serve here as a guide, but they should not be regarded as limiting in relation to the scope of the invention.

In the context of the present invention a division or resolution/separation of a material stream is to be understood as meaning production of at least two substreams from the original material stream, wherein resolution/separation is associated with an intentional alteration of the composition of matter of the obtained substreams with respect to the original material stream, for example through application of a thermal separation process to the original material stream. By contrast, division of the original material stream is generally not associated with a change in the composition of matter of the obtained substreams.

Enrichment or depletion of a component in a mixture, a fraction or a material stream is to be understood as meaning a measure, operation or process step which has the result that the mole fraction or mass fraction of this component increases (enrichment) or decreases (depletion).

The predominant portion of a fraction, of a material stream etc. is to be understood as meaning a proportion quantitatively greater than all other proportions each considered alone. Especially in the case of binary mixtures or in the case of resolving a fraction into two parts this is to be understood as meaning a proportion of more than 50% by weight unless otherwise stated in the specific case.

The indication that a material stream consists predominantly of one component or group of components is to be understood as meaning that the mole fraction or mass fraction of this component or component group is quantitatively greater than all other proportions of other components or component groups in the material stream each considered alone. Especially in the case of binary mixtures this is to be understood as meaning a proportion of more than 50%. Unless otherwise stated in the specific case this is based on the mass fraction.

The indication that a material stream is directly supplied to a specific process stage or a specific plant part is to be understood as meaning that the material stream is introduced to this process stage or this plant part without previously having been passed through other process stages or plant parts with the exception of purely transportational operations and the means required therefor, for example pipelines, valves, pumps, compressors, reservoirs.

All pressures are reported in absolute pressure units, bara for short, or in gauge pressure units, barg for short, unless otherwise stated in the particular individual context.

Fluid connection between two regions of the apparatus according to the invention is to be understood as meaning any type of connection whatsoever which makes it possible for a fluid, for example a gas stream, to flow from the one to the other of the two regions, neglecting any interposed regions or components. In particular a direct fluid connection is to be understood as meaning any type of connection whatsoever which makes it possible for a fluid, for example a gas stream, to flow directly from the one to the other of the two regions, wherein no further regions or components are interposed with the exception of purely transportational operations and the means required therefor, for example pipelines, valves, pumps, compressors, reservoirs. One example would be a pipeline leading directly from the one to the other of the two regions.

A means is to be understood as meaning something that enables or is helpful in the achievement of a goal. In particular, means for performing a particular process step are to be understood as including all physical articles that would be considered by a person skilled in the art in order to be able to perform this process step. For example, a person skilled in the art will consider means of introducing or discharging a material stream to include all transporting and conveying apparatuses, i.e. for example pipelines, pumps, compressors, valves, which seem necessary or sensible to said skilled person for performance of this process step on the basis of his knowledge of the art.

The indication that two or more compressor stages are connected or arranged parallel is to be understood as meaning that a material stream which passes through one of the compressor stages and is compressed therein does not additionally pass through one of the other compressor stages to be compressed therein, wherein the two or more compressor stages may be operated independently of one another.

For the purposes of this description steam is to be understood as being synonymous with water vapour unless the opposite is indicated in an individual case.

The invention is based on the finding that in the prior art processes known hitherto for production of pure carbon monoxide and hydrogen from hydrocarbons by steam reforming the establishment of different, especially markedly different, production capacities creates difficulties. Furthermore, material streams generated as by-product streams in the workup of the raw synthesis gas have hitherto not been optimally utilized. Thus, a stream containing hydrogen and further combustible constituents obtained as a by-product in pure hydrogen production by PSA has hitherto been predominantly thermally utilized as fuel gas for the burners in the steam reforming unit. The same applies for an intermediate-pressure flash gas stream still containing significant proportions of hydrogen and carbon monoxide obtained in cryogenic gas fractionation. Furthermore, control of the distillation and separation steps contained in the coldbox is complex when the upstream synthesis gas production plant is to be operated at markedly different, in particular at small, production capacities.

The recited difficulties were reduced or entirely avoided with the invention. The inventive operations of supplying at least a portion of one or more streams selected from a group comprising:
  the predominantly carbon dioxide-containing stream,
  the methane-containing fractionation gas stream,
  the carbon monoxide- and hydrogen-containing flash gas stream,
to a compressor unit, discharging a compressed first recycle stream from the compressor unit and recycling for example to the steam reforming unit improve the material utilization of the components such as hydrogen, carbon oxides, in particular carbon monoxide, or methane present in the recycle stream.

Furthermore, the inventive configuration of the process or the plant with at least two parallel compressor stages markedly increases the adjustable production capacity span. Accordingly a configuration of the recirculating compressor having for example three parallel compressor stages each having 50% of the nominal capacity allows a capacity range between 50% (partial load operation) and 150% (full load operation) and thus very flexible operation of the synthesis gas production plant. By contrast, an embodiment of the recirculating compressor having two parallel compressor stages each having 50% of the nominal capacity opens up a capacity range between 50% (partial load operation) and 100% (full load operation).

In order during partial load operation to advantageously utilize the compressor stages not required in each case the invention provides for utilizing these compressor stages for recycling one or more of the by-product streams generated during workup of the raw synthesis gas to the drying unit arranged upstream of the low-temperature fractionation unit. This results in an artificial load on the low-temperature fractionation unit during partial load operation, thus allowing simpler control and more stable operation of the distillation and separation steps contained in the coldbox. To this end the two or more compressor stages which thus serve different purposes are advantageously gas-tightly separated from one another so that there is no direct fluid connection between them by provision of valves, blanking plates or similar means. The respective material streams are thus kept separate so as to avoid undesired mixing which would result for example in entrainment of carbon dioxide into the low-temperature fractionation unit which through formation of dry ice would lead to blockages therein.

A second aspect of the process according to the invention is characterized in that at least a portion of the compressed first recycle stream is recycled to the steam reforming unit, introduced thereto and at least partially converted under steam reforming conditions. In this way products of value present in these streams such as hydrogen, carbon oxides, in particular carbon monoxide, or methane are materially utilized. This allows the supply of input stream hydrocarbons to be reduced, thus leading to savings, at identical production capacity of pure carbon monoxide and hydrogen.

A third aspect of the process according to the invention is characterized in that at least a portion of the predominantly carbon dioxide-containing stream is supplied to a first compressor stage and compressed and the compressed stream is recycled to the steam reforming unit, introduced thereto and at least partially converted under steam reforming conditions. This allows the carbon dioxide present in this stream to be materially utilized, thus reducing the supply of input stream hydrocarbons at identical production capacity of pure carbon monoxide and hydrogen. This is of particular importance in the case of the predominantly carbon dioxide-containing stream since it cannot be otherwise utilized as fuel gas for example. The flexibility of the process in respect of the ratio of the produced target products carbon monoxide and hydrogen is moreover increased: At higher recycling of carbon dioxide, proportionally more carbon monoxide is produced in the product.

A fourth aspect of the process according to the invention is characterized in that at least a portion of the methane-containing fractionation gas stream is supplied to the first compressor stage and compressed and the compressed stream is recycled to the steam reforming unit, introduced thereto and at least partially converted under steam reforming conditions. This aspect of the process according to the invention also results in savings of input stream hydrocarbons at identical production capacity of pure carbon monoxide and hydrogen.

A fifth aspect of the process according to the invention is characterized in that at least a portion of the carbon monoxide- and hydrogen-containing flash gas stream is supplied to a second compressor stage and compressed and the compressed stream is recycled to the drying unit and introduced thereto, wherein the second compressor stage is not in direct fluid connection with the first compressor stage. This results in an artificial load on the low-temperature fractionation unit especially during partial load operation, thus allowing simpler control and more stable operation of the distillation and separation steps contained in the coldbox. By contrast, the first parallel compressor stage may continue to be used for recycling of material streams to the steam reforming unit, thus resulting in the described savings of input stream hydrocarbons.

A sixth aspect of the process according to the invention is characterized in that at least a portion of the pure carbon monoxide product gas stream is supplied to the second compressor stage and compressed and the compressed stream is recycled to the drying unit and introduced thereto, wherein the second compressor stage is not in direct fluid connection with the first compressor stage. This too results in an artificial load on the low-temperature fractionation unit especially during partial load operation, thus allowing simpler control and more stable operation of the distillation and separation steps contained in the coldbox. By contrast, the first parallel compressor stage may continue to be used for recycling of material streams to the steam reforming unit, thus resulting in the described savings of input stream hydrocarbons. A partial, preferably time-limited, consumption of the pure carbon monoxide product gas stream for the described purpose may also be advantageous to ensure the operating stability of the low-temperature fractionation unit. This may be the case especially during operational disruptions or transitions between different operating states which result in a marked reduction of the input stream into the low-temperature fractionation unit.

A seventh aspect of the process according to the invention is characterized in that at least a portion of the PSA offgas stream is supplied to the second compressor stage and compressed and the compressed stream is recycled to the drying unit and introduced thereto, wherein the second compressor stage is not in direct fluid connection with the first compressor stage. This too results in an artificial load on the low-temperature fractionation unit especially during partial load operation, thus allowing simpler control and more stable operation of the distillation and separation steps contained in the coldbox, while the first parallel compressor stage may continue to be used for recycling of material streams to the steam reforming unit.

The eighth aspect of the process according to the invention is characterized in that at least a portion of the predominantly carbon dioxide-containing stream and at least a portion of the methane-containing fractionation gas stream are supplied to a first compressor stage and compressed and the compressed stream is recycled to the steam reforming unit, introduced thereto and at least partially converted under steam reforming conditions and in that at least a portion of the carbon monoxide- and hydrogen-containing flash gas stream and at least a portion of the pure carbon monoxide product gas stream and at least a portion of the PSA offgas stream are supplied to a second compressor stage and compressed and the compressed stream is recycled to the drying unit and introduced thereto, wherein the second compressor stage is not in direct fluid connection with the first compressor stage. This too results in an artificial load on the low-temperature fractionation unit especially during partial load operation, thus allowing simpler control and more stable operation of the distillation and separation steps contained in the coldbox, while the first parallel compressor stage may continue to be used for recycling of material streams to the steam reforming unit. The multiplicity of combinations of the individual recited material streams as substreams for making up the recycle streams to the steam reforming unit on the one hand and to the low-temperature fractionation unit on the other hand which is possible in this embodiment allows changes between different load states of the production plant to be particularly finely compensated without needing to subject individual process stages to particularly high loads because individual material streams entering or exiting them are entirely utilized as recycle streams, thus impairing the constant operation of these process stages.

A ninth aspect of the process according to the invention is characterized in that at least a portion of the hydrogen-enriched gas stream is used for regenerating a drying medium arranged in the drying unit before it is passed to the pressure swing adsorption unit. This makes it possible to achieve a high availability of regenerated adsorption/drying medium in the drying unit. This applies especially when the drying unit is configured with a plurality individual trains operated in parallel, of which at least one train is in loading mode and at least one further train is in regeneration mode at any time.

In a further aspect the plant according to the invention is characterized in that it comprises means that make it possible for at least a portion of the compressed first recycle stream to be recycled to the steam reforming unit and introduced thereto. The advantages of this aspect of the plant according to the invention correspond to those of the second aspect of the process according to the invention.

In a further aspect the plant according to the invention is characterized in that it comprises means that make it possible for at least a portion of the predominantly carbon dioxide-containing stream to be supplied to a first compressor stage and compressed and the compressed stream to be recycled to the steam reforming unit and introduced thereto. The advantages of this aspect of the plant according to the invention correspond to those of the third aspect of the process according to the invention.

In a further aspect the plant according to the invention is characterized in that it comprises means that make it possible for at least a portion of the methane-containing fractionation gas stream to be supplied to the first compressor stage and compressed and the compressed stream to be recycled to the steam reforming unit and introduced thereto. The advantages of this aspect of the plant according to the invention correspond to those of the fourth aspect of the process according to the invention.

In a further aspect the plant according to the invention is characterized in that it comprises means which make it possible for at least a portion of the carbon monoxide- and hydrogen-containing flash gas stream to be supplied to a second compressor stage and compressed and the compressed stream to be recycled to the drying unit and introduced thereto, wherein the second compressor stage is not in direct fluid connection with the first compressor stage. The advantages of this aspect of the plant according to the invention correspond to those of the fifth aspect of the process according to the invention.

In a further aspect the plant according to the invention is characterized in that it comprises means which make it possible for at least a portion of the pure carbon monoxide product gas stream to be supplied to the second compressor stage and compressed and the compressed stream to be recycled to the drying unit and introduced thereto, wherein the second compressor stage is not in direct fluid connection with the first compressor stage. The advantages of this aspect of the plant according to the invention correspond to those of the sixth aspect of the process according to the invention.

In a further aspect the plant according to the invention is characterized in that it comprises means which make it possible for at least a portion of the PSA offgas stream to be supplied to the second compressor stage and compressed and the compressed stream to be recycled to the drying unit and introduced thereto, wherein the second compressor stage is not in direct fluid connection with the first compressor stage. The advantages of this aspect of the plant according to the invention correspond to those of the seventh aspect of the process according to the invention.

In a further aspect the plant according to the invention is characterized in that it comprises means which make it possible for least a portion of the predominantly carbon dioxide-containing stream and at least a portion of the methane-containing fractionation gas stream to be supplied to a first compressor stage and compressed and the compressed stream to be recycled to the steam reforming unit and introduced thereto and for at least a portion of the carbon monoxide- and hydrogen-containing flash gas stream and at least a portion of the pure carbon monoxide product gas stream and at least a portion of the PSA offgas stream to be supplied to a second compressor stage and compressed and the compressed stream to be recycled to the drying unit and introduced thereto, wherein the second compressor stage is not in direct fluid connection with the first compressor stage. The advantages of this aspect of the plant according to the invention correspond to those of the eighth aspect of the process according to the invention.

BRIEF DESCRIPTION OF THE DRAWINGS

Further developments, advantages and possible uses of the invention may also be derived from the following description of working examples and the drawings. All features described and/or depicted form, either in themselves or in any combination, the invention, regardless of the way they are combined in the claims or the back-references therein.

DETAILED DESCRIPTION OF PREFERRED EMBODIMENTS

Figure 1:
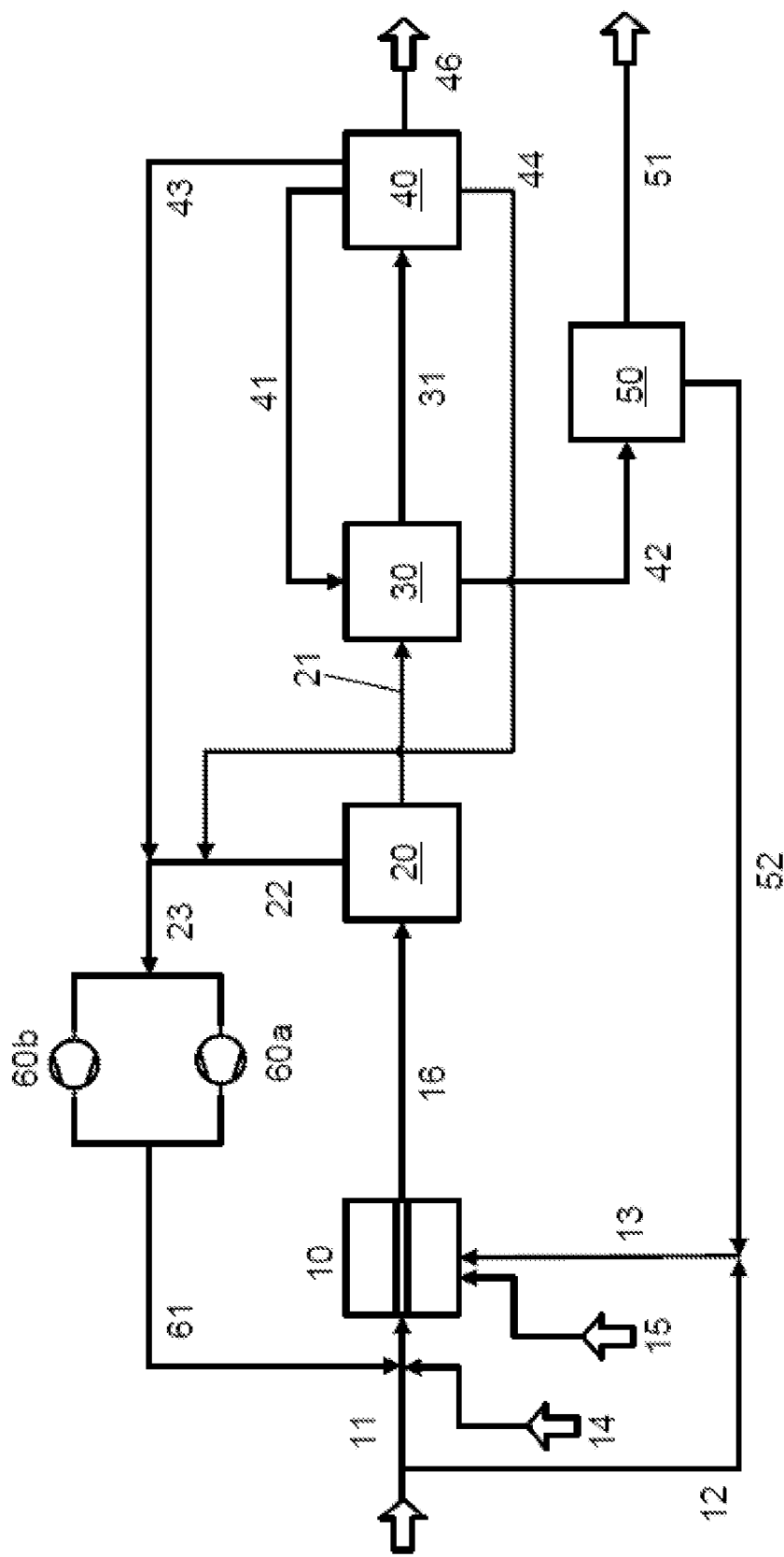
FIG. 1 is a first example of a process/a plant for production of pure carbon monoxide and hydrogen according to the invention.

In the inventive embodiment of a process/a plant for production of pure carbon monoxide and hydrogen shown in FIG. 1 an input stream containing hydrocarbons, preferably methane or naphtha, is supplied via conduit 11 to a steam reforming unit 10 and introduced thereto together with a steam stream supplied via conduit 14. Via conduits 12 and 13 a substream of the hydrocarbons-containing input stream is passed as fuel gas to the burners (not shown) of the steam reforming unit and burnt therein with an air stream supplied via conduit 15 to heat the reformer tubes filled with reforming catalyst arranged in the steam reforming unit.

The steam reforming unit performs an at least partial conversion of the hydrocarbons present in the input stream with steam under steam reforming conditions in the reformer tubes filled with reforming catalyst to afford a raw synthesis gas stream containing carbon monoxide, hydrogen, water, carbon dioxide and methane which is discharged from the steam reforming unit via conduit 16 and introduced to a carbon dioxide removal unit 20. This may be configured according to a process for carbon dioxide removal which is known per se, for example using physical or chemical absorption or gas scrubbing. A known and often employed process is the Rectisol process which comprises a scrubbing of the raw synthesis gas with cryogenic methanol as the absorbent and is likewise described in principle in the abovementioned document. Other scrubbing processes employ other scrubbing or absorption media, for example N-methylpyrrolidone (NMP), secondary amines, for example diethanolamine, tertiary amines, for example methyldiethanolamine (MDEA), polyethylene glycol dialkyl ethers, for example polyethylene glycol dimethyl ether. Since the input stream supplied to the steam reforming unit has generally already been desulfurized the carbon dioxide removal unit may be configured/optimized for removal of $CO_2$.

The carbon dioxide-depleted synthesis gas stream is discharged from the carbon dioxide removal unit via conduit 21 and introduced to a drying unit 30. A stream containing predominantly carbon dioxide is discharged from the carbon dioxide removal unit via conduit 22 and recycled via conduit 23, a two-stage compressor unit 60a, 60b and conduits 61 and 11 to the entrance of the steam reforming unit.

In the drying unit the carbon dioxide-depleted synthesis gas stream is over an adsorbent based on molecular sieves freed by means of adsorption from proportions of water and further undesired trace impurities, for example remaining $CO_2$ traces, since these would lead in the subsequent low-temperature fractionation to formation of ice/dry ice and thus to blockages of the apparatuses there. This affords a dried synthesis gas stream which is discharged from the drying unit via conduit 31 and introduced to a multistage low-temperature fractionation unit 40 which in the present example is configured as methane scrubbing. The recited apparatuses/process stages are accommodated in a common housing filled with insulating material, the so-called cold-box.

In the low-temperature fractionation unit the first column, the so-called scrubbing column, removes the majority of the hydrogen from the cooled raw synthesis gas by scrubbing-out of the other components. This affords a hydrogen-enriched gas stream which is discharged via conduit 41. The solvent used is supercooled, high-purity liquid methane which is cooled with evaporating CO to remove the heat of solution. In the downstream hydrogen stripping column the bottoms product from the scrubbing column is freed of the still-dissolved hydrogen to obtain a carbon monoxide- and hydrogen-containing flash gas stream as the tops product which is discharged via conduit 43. The CO/methane bottoms product from the hydrogen stripping column is resolved in the downstream CO/methane distillation column to obtain as the tops product a pure carbon monoxide product gas stream which is discharged from the process via conduit 46 and sent for storage, treatment or further processing (not shown). The methane obtained as the bottoms product from the CO/methane distillation column is discharged from the low-temperature fractionation unit via conduit 44 as the methane-containing fractionation gas stream and recycled via conduits 22 and 23, a two-stage compressor unit 60*a*, 60*b* and conduits 61 and 11 to the entrance of the steam reforming unit.

The hydrogen-enriched gas stream is discharged from the low-temperature fractionation unit via conduit 41 and introduced to a pressure swing adsorption unit 50 via conduit 42. Prior to this the hydrogen-enriched gas stream is used for regenerating the adsorbent used in the drying unit.

The pressure swing adsorption unit affords a pure hydrogen product gas stream which is discharged from the process via conduit 51 and sent for storage, treatment or further processing (not shown). Also obtained is a PSA offgas stream which still contains combustible constituents, for example methane. Said stream is discharged from the pressure swing adsorption unit via conduit 52 and may be sent for subsequent storage, treatment or further processing. Due to its calorific value it is in the present working example utilized as a fuel gas stream and via conduits 52 and 13 supplied to the burners (not shown) of the steam reforming unit as a further fuel gas stream.

According to the invention one or more or all of the following material streams:
the predominantly carbon dioxide-containing stream, conduit 22
the methane-containing fractionation gas stream, conduit 44,
the carbon monoxide- and hydrogen-containing flash gas stream, conduit 43,
are introduced to a compressor unit which in the present working example comprises two parallel compressor stages 60*a*, 60*b*, wherein the at least one portion of the one or more streams is introduced to one or to both compressor stages. This makes it possible to realize different load states/production capacities of the process/of the plant. Accordingly the configuration of the recirculating compressor as a compressor unit having two parallel compressor stages each having 50% of the nominal capacity allows a capacity range between 50% (partial load operation) and 100% (full load operation) and thus very flexible operation of the synthesis gas production plant.

Obtained in this way is a compressed first recycle stream which is discharged from the compressor unit via conduit 61 and in the exemplary embodiment shown in FIG. 1 at least partially, preferably predominantly, most preferably completely, recycled via conduits 61 and 11 to the steam reforming unit and introduced thereto. This improves the material utilization of the components such as hydrogen, carbon oxides or methane present in the recycle stream. According to the prior art processes these components would be predominantly thermally utilized, for example as a further fuel gas or heating gas for the burners of the steam reforming unit.

The exemplary embodiment of FIG. 1 may be modified such that in each case at least a portion of the methane-containing fractionation gas stream, conduit 44, and/or of the carbon monoxide- and hydrogen-containing flash gas stream, conduit 43, is supplied via conduit 13 to the burners of the steam reforming unit as further fuel gas or heating gas via connecting conduits (not shown). This further increases the flexibility of the process in particular operating states/load states or during transition between two different operating states, wherein it is then temporarily accepted that the components such as hydrogen, carbon oxides or methane present in the recycle streams are also or predominantly utilized thermally rather than materially.

Figure 2:
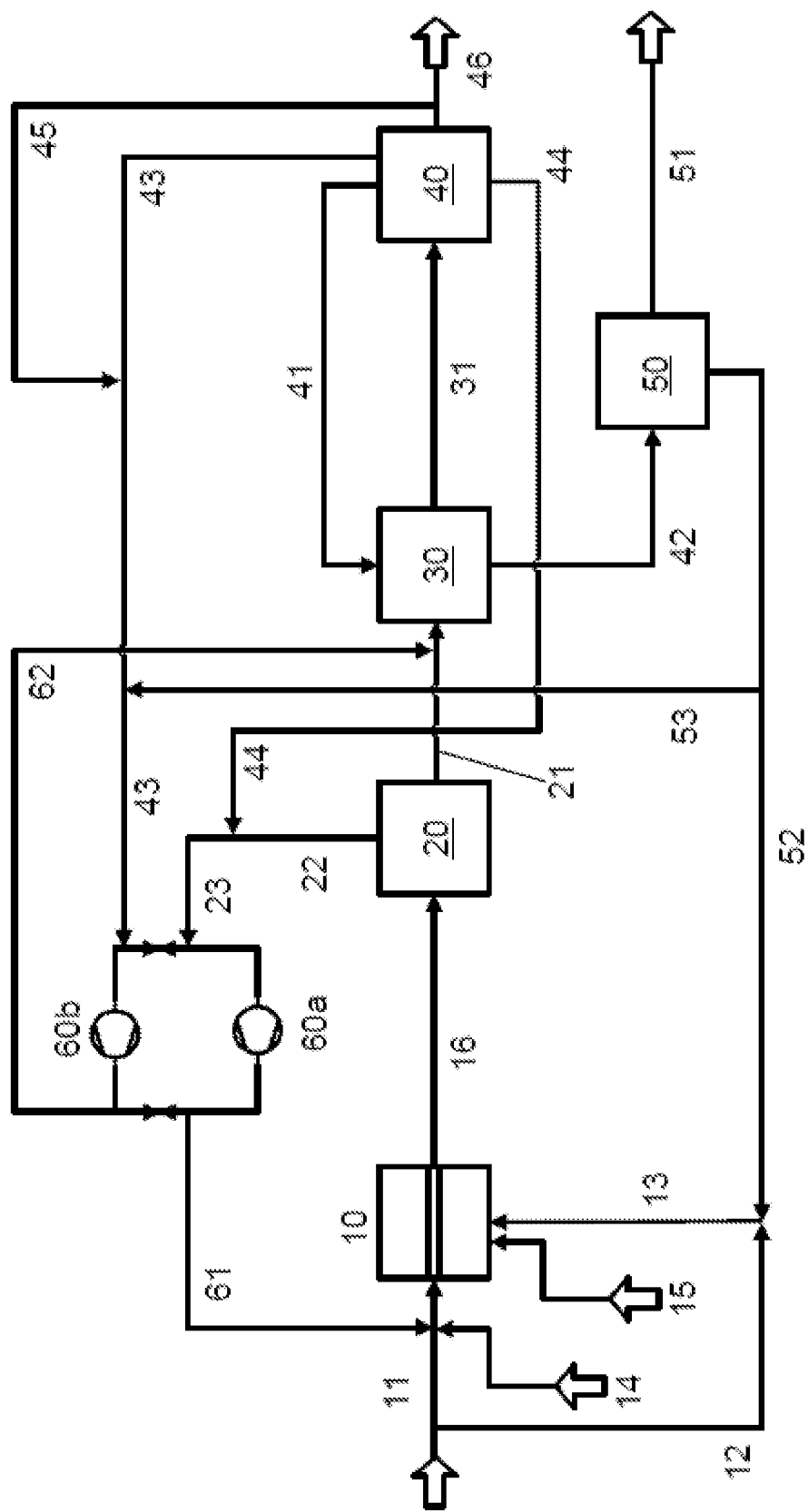
FIG. 2 is a second example of a process/a plant for production of pure carbon monoxide and hydrogen according to the invention

In the further inventive embodiment of a process/a plant for production of pure carbon monoxide and hydrogen shown in FIG. 2 the compressor unit likewise comprises two parallel compressor stages 60*a*, 60*b* which, however, are now flow-separated from one another via suitable shutoff devices, for example the closed valves indicated in FIG. 2, and are thus not in direct fluid connection with one another. The compressor stage 60*a* is supplied via conduits 22 and 23 with the predominantly carbon dioxide-containing stream from the carbon dioxide removal unit and via conduits 44 and 23 with the methane-containing fractionation gas stream and said streams are compressed therein as is also the case in the working example of FIG. 1. The components such as hydrogen, carbon oxides or methane present in these recycle streams thus continue to be materially utilized to increase the production of the target components pure carbon monoxide and hydrogen.

The compressor stage 60*b* is by contrast supplied via conduit 43 with at least a portion of the carbon monoxide- and hydrogen-containing flash gas stream and/or via conduits 45 and 43 with at least a portion of the pure carbon monoxide product gas stream and/or via conduits 53 and 43 with at least a portion of the PSA offgas stream. Any alternative or additive combination of the three abovementioned streams is possible in principle. It is advantageous that especially in partial load operation the compressor stages not needed in each case are utilized for recycling one or more of the abovementioned material streams to the drying unit arranged upstream of the low-temperature fractionation unit. This results in an artificial load on the low-temperature fractionation unit during partial load operation, thus allowing simpler control and more stable operation of the distillation and separation steps contained in the coldbox. To this end the two or more compressor stages which thus serve different purposes are advantageously gas-tightly separated from one another so that there is no direct fluid connection between them by provision of valves, blanking plates or similar means. The respective material streams are thus kept separate so as to avoid undesired mixing which would result for example in entrainment of carbon dioxide into the low-temperature fractionation unit which through formation of dry ice would lead to blockages therein.

The exemplary embodiment of FIG. 2 may in turn also be modified such that in each case at least a portion of the methane-containing fractionation gas stream, conduit 44, and/or of the carbon monoxide- and hydrogen-containing flash gas stream, conduit 43, and/or of the PSA offgas stream is supplied via conduit 13 to the burners of the steam reforming unit as further fuel gas or heating gas via connecting conduits (not shown). This further increases the flexibility of the process in particular operating states/load states or during transition between two different operating states, wherein it is then temporarily accepted that the components such as hydrogen, carbon oxides, in particular carbon monoxide, or methane present in the recycle streams are also or predominantly utilized thermally rather than materially.

Depending on the desired production capacity of the plant the two working examples shown in FIG. 1 and FIG. 2 may be interconverted by closing the conduit paths of the conduits 53 and 62 via suitable shutoff devices (not shown). In addition, the flow-separation between the two compressor stages 60a, 60b may optionally be suspended by opening the valves shown. The option of such an interconverting between different working examples/operating modes with low apparatus complexity is also counted among the advantages of the process according to the invention/a corresponding plant.

List of reference signs

| | |
|---|---|
| 10 | Steam reforming unit |
| 11-16 | Conduit |
| 20 | Carbon dioxide removal unit |
| 21-23 | Conduit |
| 30 | Drying unit |
| 31 | Conduit |
| 40 | Low-temperature fractionation unit |
| 41-46 | Conduit |
| 50 | Pressure swing adsorption unit |
| 51-53 | Conduit |
| 60a, 60b | Compressor stages |
| 61-62 | Conduit |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for production of pure carbon monoxide and hydrogen from a gaseous or vaporous input stream containing hydrocarbons, comprising:
   (a) introducing the hydrocarbons-containing input stream and a steam stream into a steam reforming unit and at least partially converting the hydrocarbons present in the input stream with steam under steam reforming conditions to afford a raw synthesis gas stream containing carbon monoxide, hydrogen, water, carbon dioxide and methane,
   (b) discharging the raw synthesis gas stream from the steam reforming unit and introducing same into a carbon dioxide removal unit,
   (c) resolving the raw synthesis gas stream in the carbon dioxide removal unit under carbon dioxide removal conditions into a predominantly carbon dioxide-containing stream and into a carbon dioxide-depleted synthesis gas stream, discharging both streams from the carbon dioxide removal unit,
   (d) introducing the carbon dioxide-depleted synthesis gas stream into a drying unit, discharging a water-depleted, dried synthesis gas stream from the drying unit,
   (e) introducing the dried synthesis gas stream into a low-temperature fractionation unit, multistage resolution of the dried synthesis gas stream under low-temperature fractionation conditions into a pure carbon monoxide product gas stream, a hydrogen-enriched gas stream, a methane-containing fractionation gas stream and a carbon monoxide- and hydrogen-containing flash gas stream, discharging the gas streams obtained in the multistage resolution from the low-temperature fractionation unit,
   (f) supplying the hydrogen-enriched gas stream to a pressure swing adsorption unit (PSA), resolving the hydrogen-enriched gas stream in the pressure swing adsorption unit into a pure hydrogen product gas stream and a PSA offgas stream, discharging both streams from the pressure swing adsorption unit,
   (g) supplying at least a portion of one or more streams selected from a group comprising:
      the predominantly carbon dioxide-containing stream,
      the methane-containing fractionation gas stream,
      the carbon monoxide- and hydrogen-containing flash gas stream,
   to a compressor unit which comprises at least two parallel compressor stages, wherein the at least one portion of the one or more streams is introduced to one or more of the compressor stages, and
   (h) discharging a compressed first recycle stream from the compressor unit,
      wherein at least a portion of the carbon monoxide- and hydrogen-containing flash gas stream is supplied to a second compressor stage and compressed and the compressed stream is recycled to the drying unit and introduced thereto, wherein the second compressor stage is not in direct fluid connection with the first compressor stage, or
      wherein at least a portion of the pure carbon monoxide product gas stream is supplied to the second compressor stage and compressed and the compressed stream is recycled to the drying unit and introduced thereto, wherein the second compressor stage is not in direct fluid connection with the first compressor stage,
      wherein at least a portion of the PSA offgas stream is supplied to the second compressor stage and compressed and the compressed stream is recycled to the drying unit and introduced thereto, wherein the second compressor stage is not in direct fluid connection with the first compressor stage, or
      wherein at least a portion of the predominantly carbon dioxide-containing stream and at least a portion of the methane-containing fractionation gas stream are supplied to a first compressor stage and compressed and the compressed stream is recycled to the steam reforming unit, introduced thereto and at least partially converted under steam reforming conditions and in that at least a portion of the carbon monoxide- and hydrogen-containing flash gas stream and at least a portion of the pure carbon monoxide product gas stream and at least a portion of the PSA offgas stream are supplied to a second compressor stage and compressed and the compressed stream is recycled to the drying unit and introduced thereto, wherein the second compressor stage is not in direct fluid connection with the first compressor stage, or
      wherein at least a portion of the hydrogen-enriched gas stream is used for regenerating a drying medium arranged in the drying unit before it is passed to the pressure swing adsorption unit.

2. A plant for production of pure carbon monoxide and hydrogen from a gaseous or vaporous input stream containing hydrocarbons, comprising the following assemblies and plant constituents:
- (a) a steam reforming unit, a means for introducing the hydrocarbons-containing input stream and a steam stream into the steam reforming unit,
- (b) a means for discharging the raw synthesis gas stream from the steam reforming unit, a carbon dioxide removal unit and a means for introducing the raw synthesis gas stream into the carbon dioxide removal unit,
- (c) a means for discharging a predominantly carbon dioxide-containing stream and a carbon dioxide-depleted synthesis gas stream from the carbon dioxide removal unit,
- (d) a drying unit, a means for introducing the carbon dioxide-depleted synthesis gas stream into the drying unit, a means for discharging a water-depleted, dried synthesis gas stream from the drying unit,
- (e) a low-temperature fractionation unit comprising a plurality of separation stages, a means for introducing the dried synthesis gas stream into the low-temperature fractionation unit, a means for discharging a pure carbon monoxide product gas stream, a hydrogen-enriched gas stream, a methane-containing fractionation gas stream and a carbon monoxide- and hydrogen-containing flash gas stream from the low-temperature fractionation unit,
- (f) a pressure swing adsorption unit (PSA), a means for supplying the hydrogen-enriched gas stream to the pressure swing adsorption unit, a means for discharging a pure hydrogen product gas stream and a PSA offgas stream from the pressure swing adsorption unit,
- (g) a compressor unit comprising at least two parallel compressor stages, a means for supplying at least a portion of one or more streams selected from a group comprising:
  - the predominantly carbon dioxide-containing stream,
  - the methane-containing fractionation gas stream,
  - the carbon monoxide- and hydrogen-containing flash gas stream, to the compressor unit, wherein the a means for supplying are configured such that the at least one portion of the one or more streams is introducible into one or more of the compressor stages, and

- (h) a means for discharging a compressed first recycle stream from the compressor unit,
  further comprising a means which make it possible for at least a portion of the carbon monoxide- and hydrogen-containing flash gas stream to be supplied to a second compressor stage and compressed and the compressed stream to be recycled to the drying unit and introduced thereto, wherein the second compressor stage is not in direct fluid connection with the first compressor stage, or
  further comprising a means which make it possible for at least a portion of the pure carbon monoxide product gas stream to be supplied to the second compressor stage and compressed and the compressed stream to be recycled to the drying unit and introduced thereto, wherein the second compressor stage is not in direct fluid connection with the first compressor stage, or
  further comprising a means which make it possible for at least a portion of the PSA offgas stream to be supplied to the second compressor stage and compressed and the compressed stream to be recycled to the drying unit and introduced thereto, wherein the second compressor stage is not in direct fluid connection with the first compressor stage, or
  further comprising a means which make it possible for at least a portion of the predominantly carbon dioxide-containing stream and at least a portion of the methane-containing fractionation gas stream to be supplied to a first compressor stage and compressed and the compressed stream to be recycled to the steam reforming unit and introduced thereto and for at least a portion of the carbon monoxide- and hydrogen-containing flash gas stream and at least a portion of the pure carbon monoxide product gas stream and at least a portion of the PSA offgas stream to be supplied to a second compressor stage and compressed and the compressed stream to be recycled to the drying unit and introduced thereto, wherein the second compressor stage is not in direct fluid connection with the first compressor stage.

* * * * *